(12) United States Patent
Clark et al.

(10) Patent No.: US 6,242,035 B1
(45) Date of Patent: Jun. 5, 2001

(54) REDUCED MOLECULAR WEIGHT NATIVE GELLAN GUM

(75) Inventors: Ross Clark; Neil Morrison; You-Lung Chen; Todd Talashek; Dan Burgum, all of San Diego, CA (US)

(73) Assignee: CP Kelco U.S., Inc., Wilmington, DE (US)

( * ) Notice: Subject to any disclaimer, the term of this patent is extended or adjusted under 35 U.S.C. 154(b) by 0 days.

(21) Appl. No.: 09/197,644

(22) Filed: Nov. 23, 1998

(51) Int. Cl.$^7$ ........................................................ A23L 1/054
(52) U.S. Cl. ............................................. 426/573; 536/123
(58) Field of Search ................................ 536/114, 123.1, 536/126, 123, 124; 252/315.01; 426/573

(56) References Cited

U.S. PATENT DOCUMENTS 5,633,030 * 5/1997 Marrs et al. .......................... 426/573
5,869,118 * 2/1999 Morris et al. .......................... 426/72

FOREIGN PATENT DOCUMENTS 2 521 569   8/1983   (FR) .
2 116 576   1/1983   (GB) .

OTHER PUBLICATIONS

Kerkenaar et al., *J. Chem. Technol. Biotech.*, 56(4):414–415, 1993.*
Hashimoto et al. *Arch. Biochem. Biophys.*, vol. 339(1), pp. 17–23, Mar. 1997.*
Chemical Abstracts, vol. 131, No. 4 (Jul. 1999) 44062.

* cited by examiner

*Primary Examiner*—Keith Hendricks
(74) *Attorney, Agent, or Firm*—Fitzpatrick, Cella, Harper & Scinto

(57) ABSTRACT

This invention provides reduced molecular weight gellan gums. The reduced molecular weight gellan gums of this invention generally have a weight average molecular weight less than about $1.7 \times 10^6$, and typically in a range of about $1.2 \times 10^6$ to about $9.3 \times 10^5$. This invention also provides compositions, e.g., solutions and gels, comprising reduced molecular weight gellan gums. The reduced molecular weight gellan gums of this invention may be prepared by any method which reduces the molecular weight of polymers. Such methods include homogenization, sonication, radiation, oxidation and hydrolysis.

27 Claims, 2 Drawing Sheets

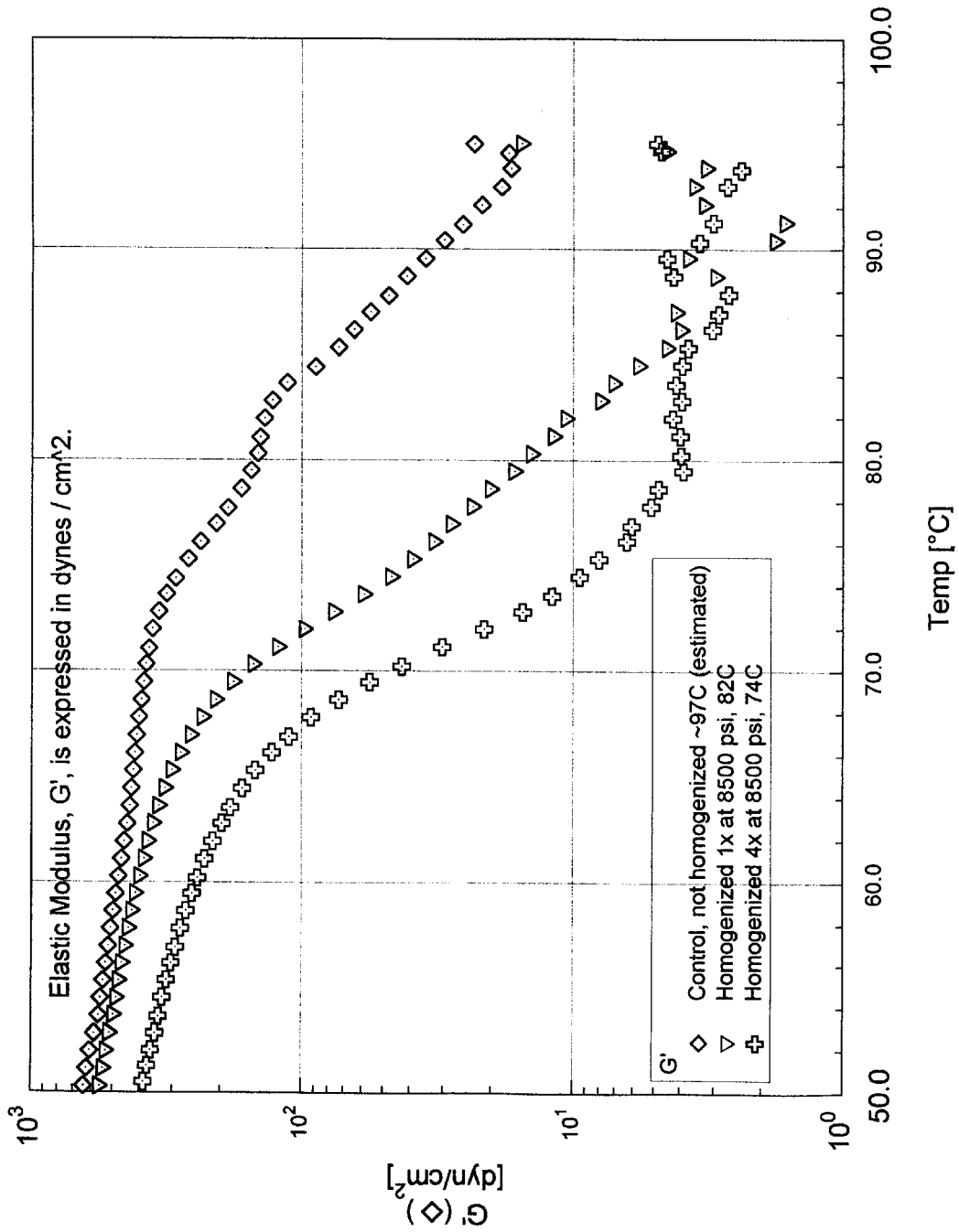
Figure 1. Effect of APV Gaulin Homogenization on Gellan Gum Set Temperature

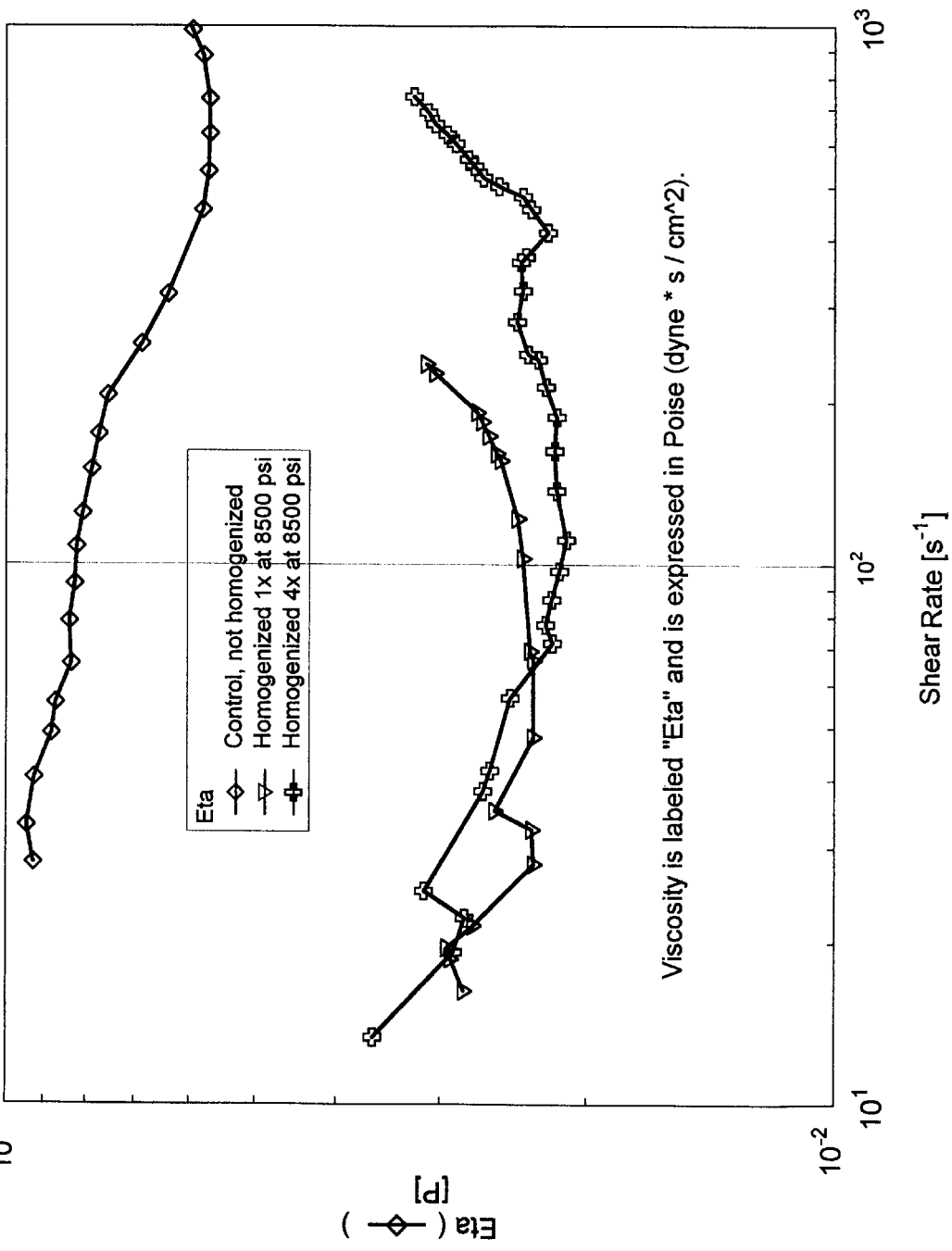
Figure 2. Effect of APV Gaulin Homogenization on Gellan Gum Hot Viscosity

REDUCED MOLECULAR WEIGHT NATIVE GELLAN GUM

BACKGROUND OF THE INVENTION

1. Field of the Invention

This invention relates to a reduced molecular weight native gellan gum.

2. Description of the Related Art

Gellan gum is a high molecular weight polysaccharide produced by fermentation. The constituent sugars of gellan gum are glucose, glucuronic acid and rhamnose in the molar ratio of 2:1:1. These sugars are linked together to give a primary structure consisting of a linear tetrasaccharide repeat unit as shown below:

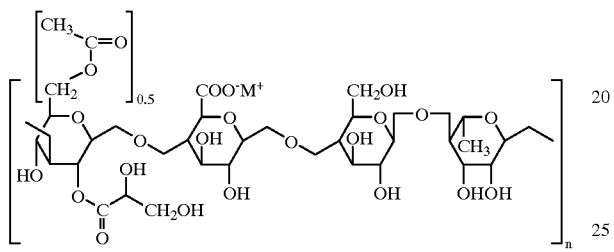

In gellan gum's native or high acyl form, two acyl substituents, acetate and glycerate, are present. Both substituents are located on the same glucose residue, and on average, there is one glycerate per repeat unit and one acetate every two repeat units.

Gums are primarily used to thicken or gel water and are frequently classified into two groups: thickeners and gelling agents. Typical thickeners include starches, guar gum, carboxymethylcellulose, alginate, methylcellulose, gum karaya and gum tragacanth. Common gelling agents include gelatin, starch, alginate, pectin, carrageenan, agar and methylcellulose.

Gelling agents are used by the food industry in a variety of applications, including confectionery jellies, jams and jellies, dessert gels, icings and dairy products. Gelling agents differ in the conditions under which they can be used as well as in the texture of the gels they form. These distinctive properties of gels have led to the exclusive use of certain gelling agents in a number of products (e.g., starch in confectionery jellies; gelatin in capsules; agar in icings; and alginate in pimento strips).

Gels can be formed in a number of ways. Gels which form upon cooling a hot solution of the gelling agent are classified as thermally setting gels. Typical thermally setting gels include gelatin, blends of xanthan gum and locust bean gum, and agar. Gels which require addition of ions to the gelling agent solution in order to set are classified as ionic setting gels. Common ionic setting gels include alginate, kappa carrageenan, low methoxy pectin and gellan gum.

Generally, ionic setting gels are ion specific. For example, alginate and low methoxy pectin both require the presence of $Ca^{2+}$ ions in order to gel, while kappa carrageenan will gel only in the presence of $K^+$ ions. Gellan gum is unique among ionic setting gelling agents because it forms gels with almost all ions, including hydrogen ions.

Perhaps the most familiar gelling agent is gelatin, which is used to prepare, among other products, dessert gels that are popular in many parts of the world. Unlike polysaccharide gelling agents, gelatin is a protein derived from animal sources. Gelatin possesses many desirable characteristics, including a melting temperature below body temperature. Consequently, gels made from gelatin melt in the mouth; this characteristic provides enhanced organoleptic properties.

However, many consumers today are interested in food products which are free from ingredients derived from animal sources. Consequently, it would be desirable to provide a gelling agent, derived from a non-animal source, which could be used in place of gelatin in selected food products.

Native gellan gum, which is produced by bacterial fermentation, forms gels that have a texture similar to that of gelatin gels. But solutions prepared with native gellan gum are highly viscous even at elevated temperatures. In addition, these solutions gel at high temperatures.

SUMMARY OF THE INVENTION

This invention provides reduced molecular weight gellan gums of the formula:

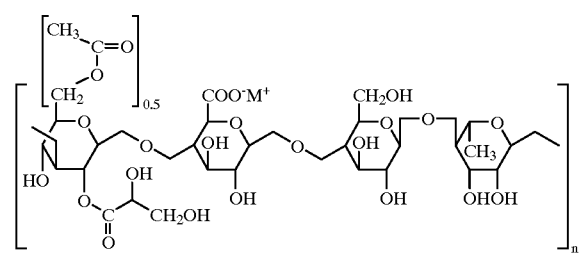

having a weight average molecular weight of less than or equal to about $1.7 \times 10^6$ as measured by SEC/MALLS (Size Exclusion Chromatography/Multiple Angle Laser Light Scattering).

This invention also provides compositions comprising reduced molecular weight gellan gums as well as a process of making such compositions.

BRIEF DESCRIPTION OF THE DRAWINGS

FIG. 1 is a graph showing the effect of lowering the molecular weight of gellan gum on the gel setting temperature of 0.5% gellan gum solutions.

FIG. 2 is a graph showing the effect of lowering the molecular weight of gellan gum on the viscosity of gellan gum solutions at 95° C.

DETAILED DESCRIPTION OF THE INVENTION

As used herein, the term "reduced molecular weight gellan gum" refers to gellan gum which has a molecular weight less than that of native gellan gum. The term "native gellan gum" refers to gellan gum produced by bacterial fermentation which has not been modified by physical or chemical means. The term "gelling salt" refers to any salt which induces solutions of gellan gum to form a gel. The reduced molecular weight gellan gums of this invention generally have a weight average molecular weight less than about $1.7 \times 10^6$, and typically in a range of about $1.4 \times 10^6$ to about $4.0 \times 10^5$.

The reduced molecular weight gellan gums of the present invention provide several advantages over native gellan gum. When compared to solutions of native gellan gum, reduced molecular weight gellan gum solutions provide reduced viscosity at elevated temperatures. This characteristic is especially advantageous in solutions having a high sugar concentration where high viscosity is a problem during processing.

The compositions of the present invention comprise a reduced molecular weight gellan gum and water. Typically, the concentration of reduced molecular weight gellan gum in water will vary from about 0.05 weight percent to about 1.0 weight percent. Preferably, the compositions are gels or solutions in which the reduced molecular weight gellan gum is completely hydrated.

The present invention also provides compositions comprising a reduced molecular weight gellan gum, water, a gelling salt and a sequestrant. The concentration of gelling salt in the compositions will vary depending upon the particular gelling salt used. For example, sodium and potassium gelling salts generally are used at concentrations ranging from about 0.020M to about 0.200M, while calcium and magnesium gelling salts typically are used at concentrations ranging from about 0.002M to about 0.015M. The amount of sequestrant used in the compositions typically ranges from about 0.05 percent to about 0.25 percent by weight.

When fully hydrated, the reduced molecular weight gellan gums of the present invention will form gels with many different ions. Preferably, the gelling salt is a calcium salt, a sodium salt or a potassium salt. Most preferably, the gelling salt is $CaCl_2$. Sodium citrate is the preferred sequestrant.

Reduced molecular weight gellan gum solutions gel at a lower temperature than do solutions of native gellan gum. Thus, native gellan gum solutions usually gel between about 80° C. and 95° C., while reduced molecular weight gellan gum solutions usually gel between about 60° C. and about 85° C. By reducing gel setting temperatures, the reduced molecular weight gellan gums of the present invention facilitate the manufacturing process.

Another advantage of the reduced molecular weight gellan gums of the present invention is that they provide gels with improved organoleptic properties. Compared to gels made with native gellan gum, gels made with reduced molecular weight gellan gum exhibit reduced cohesiveness, elasticity and firmness. Consequently, these gels have a better mouth feel than do gels prepared from native gellan gum.

The reduced molecular weight gellan gums of the present invention may be prepared by any method which reduces the molecular weight of polymers. Such methods include homogenization, sonication, radiation, oxidation and hydrolysis. Preferably, the reduced molecular weight gellan gums of the present invention are prepared by homogenization. Native gellan gum is available as Kelcogel LT-100 from the NutraSweet Kelco Company (San Diego, Calif.).

In homogenization, the sample containing the polymer is forced at high pressure (e.g., greater than 500 psi) through a small orifice. This process causes the polymer to break into smaller segments. The homogenization process may be repeated to achieve further reduction in the molecular weight of the polymer.

Sonication also may be used to reduce the molecular weight of water soluble polymers. This method involves exposing the polymer sample to high frequency waves.

The use of gamma radiation from either cobalt or electron beam sources also can reduce the molecular weight of water soluble polymers. The molecular weight reduction occurs most readily when the polymer is in the hydrated, rather than dry form. For liquid samples, radiation levels from 0.25 to 5 Mrad provide significant reductions in molecular weight.

The molecular weight of some polymers, including gellan gum, may be reduced by exposing the polymer to an oxidizing agent such as hydrogen peroxide. This oxidative degradation is enhanced by transition metal cations such as iron. It is inhibited by oxygen and free radical scavengers such as ascorbate or propyl gallate.

Acid hydrolysis is a well known technique to reduce the molecular weight of polymers. It is commonly used in chemical analysis of polysaccharides to break them down to their constituent sugars. Although many different acids may be used, generally weak acids are easier to work with than strong acids.

The reduced molecular weight gellan gums of the present invention may be used as gelling agents in a variety of fluid food products including confectionery jellies, jams and jellies, dessert gels, icings and dairy products, such as, e.g., ice cream, frozen yogurt, cottage cheese, sour cream, non-dairy frozen toppings and bakery fillings.

The examples which follow are intended to illustrate certain preferred embodiments of the invention, and no limitation of the invention is implied.

EXAMPLE 1

Preparation of Reduced Molecular Weight Gellan Gum—1× Homogenization 4 g of native gellan gum were added to 400 ml of deionized water while mixing at 800 rpm with a 2 inch, 3 blade propeller mixer in an electronically heated metal beaker. The sample was stirred for 10 minutes before being heated to 95° C. The sample was stirred at 95° C. until the gellan gum was completely hydrated.

The hydrated sample was then homogenized at 80° C.–90° C. using an APV Gaulin homogenizer set in a single stage at a pressure of 8,500 psi. While the homogenized gellan gum solution was still above 60° C., the reduced molecular weight gellan gum was precipitated using isopropyl alcohol. The precipitation step was accomplished by adding 3 volumes of the isopropyl alcohol to 1 volume of the reduced molecular weight gum solution.

The precipitated reduced molecular weight gellan gum fibers were dried under mild heat (ca. 45° C.) for 12 to 24 hours before being milled to approximately 60 to 80 mesh using a mechanical mill.

EXAMPLE 2

Preparation of Reduced Molecular Weight Gellan Gum—4× Homogenization

The procedure used was as described in Example 1, except that the gellan gum sample was passed through the homogenizer 4 times. The additional homogenizations yielded further reductions in the molecular weight of the gellan gum.

EXAMPLE 3

Preparation of Reduced Molecular Weight Gellan Gum Gels—1× Homogenization

Sufficient reduced molecular weight gellan gum, prepared as described in Example 1 above, was added to deionized water while mixing at 800 rpm with a propeller mixer to yield a gel with a gum concentration of 0.5%. After stirring for 10 minutes, the sample was heated to 95° C. After the gum was fully hydrated, a solution of 0.5M $CaCl_2$ was added in an amount sufficient such that the final gel had a $Ca^{2+}$ ion concentration of 6 mM. The solution was then poured into disk molds yielding gels approximately 7 mm thick and 25 mm in diameter upon cooling.

EXAMPLE 4

Preparation of Reduced Molecular Weight Gellan Gum Gels—4× Homogenization

The procedure used was as described in Example 3, except that the reduced molecular weight gellan gum was prepared as described in Example 2 (i.e., homogenized 4 times), and the final concentration of gum in the gel was 0.5%.

COMPARATIVE EXAMPLE 1

Native Gellan Gum Gel Preparation

The procedure used was as described in Example 3, except that native gellan gum, rather than reduced molecular weight gellan gum, was used to prepare the gel, and the final concentration of gum in the gel was 0.5%.

Gel Analysis

Texture dictates how a gel will deform under an applied force. The texture profile of a gel can be obtained by subjecting a gel sample to an increasing force and measuring the deformation that results. Samples prepared as described in Examples 3, 4 and Comparative Example 1 were evaluated for texture profile analysis using the procedure described in Szczesniak, A. S., Classification of Textural Characteristics, *J. Food Sci.*, 28 (1963) 390, the entire contents of which are incorporated by reference herein. The disk gel samples were compressed using an Instron testing machine at a rate of 2 inches per minute and to a strain level of 80%. The modulus, hardness, brittleness, elasticity and cohesiveness of the samples were calculated. The results of these calculations are presented in Tables 1A and 1B.

Modulus, often referred to as firmness, indicates how firm the gel appears when lightly squeezed. Hardness is a measure of the force required to rupture the gel. Brittleness is a measure of how far the gel can be squeezed before it breaks. Elasticity is a measure of how much the gel springs back after the first compression cycle. Cohesiveness is an indication of the difficulty in breaking the gel down in the mouth.

As shown in Tables 1A and 1B, gels prepared from reduced molecular weight gellan gum are less cohesive, elastic and firm than gels prepared from native gellan gum.

TABLE 1A

Texture Parameters of Gels Prepared with
Native and Reduced Molecular Weight Gellan Gums

| Example | Sample | Modulus | Hardness | Brittleness |
|---|---|---|---|---|
| Comparative Example 1 | 0.5% Native Gellan Gum | 2040 | 23.7 | >85% |
| Example 3 | 0.5% Gellan Gum Homogenized Once (Reduced Molecular Weight) | 2180 | 9.85 | >85% |

TABLE 1A-continued

Texture Parameters of Gels Prepared with
Native and Reduced Molecular Weight Gellan Gums

| Example | Sample | Modulus | Hardness | Brittleness |
|---|---|---|---|---|
| Example 4 | 0.5% Gellan Gum Homogenized 4 Times (Further Reduced Molecular Weight) | 2220 | 2.6 | 71.8% |

TABLE 1B

Texture Parameters of Gels Prepared with
Native and Reduced Molecular Weight Gellan Gums

| Example | Sample | Elasticity | Cohesiveness |
|---|---|---|---|
| Comparative Example 1 | 0.5% Native Gellan Gum | 63.1 | 48.5 |
| Example 3 | 0.5% Gellan Gum Homogenized Once (Reduced Molecular Weight) | 60.2 | 35.0 |
| Example 4 | 0.5% Gellan Gum Homogenized 4 Times (Further Reduced Molecular Weight) | 28.9 | 13.8 |

EXAMPLE 5

Dessert Gel Preparation

Dessert gels were prepared using untreated native gellan gum, reduced molecular weight gellan gum homogenized once, and reduced molecular weight gellan gum homogenized four times, at gum concentrations of 0.5%, 0.75% and 1.0%, respectively.

The gels were prepared as described in Examples 3, 4 and Comparative Example 1, except that sugar, adipic acid, sodium citrate, disodium phosphate, fumaric acid, flavoring and coloring were added to the solution prior to adding 0.5M $CaCl_2$. The amount of each added ingredient present in the final solution based upon a weight percent basis was as follows: sugar (13.48%), adipic acid (0.40%), sodium citrate (0.13%), disodium phosphate (0.13%), fumaric acid (0.11%), flavoring (0.02%), and color (0.01%).

Analysis of Dessert Gels

Dessert gels prepared as described in Example 5 were evaluated for texture profile as described for the gel analysis. The modulus, hardness, brittleness, elasticity and cohesiveness of the samples were calculated. The results of these calculations are presented in Tables 2A and 2B.

As Tables 2A and 2B demonstrate, dessert gels prepared from reduced molecular weight gellan gum homogenized only once are about as cohesive, elastic and firm as dessert gels prepared from native gellan gum. However, dessert gels prepared from reduced molecular weight gellan gum homogenized four times are less cohesive, elastic and firm that dessert gels prepared from native gellan gum.

TABLE 2A

Texture Parameters of Dessert Gels
Prepared with Native and Reduced Molecular weight
Gellan Gums

| Example | Sample | Modulus | Hardness | Brittleness |
|---|---|---|---|---|
| Comparative Example 5 | 0.5% Native Gellan Gum | 2288 | 7.2 | 77.1 |
| Example 5 | 0.75% Gellan Gum Homogenized Once (Reduced Molecular weight) | 3145 | 8.1 | 75.2 |
| Example 5 | 1.0% Gellan Gum Homogenized 4 Times (Reduced Molecular weight) | 3238 | 5.1 | 79.6 |

TABLE 2B

Texture Parameters of Dessert Gels
Prepared with Native and Reduced Molecular Weight
Gellan Gums

| Example | Sample | Elasticity | Cohesiveness |
|---|---|---|---|
| Comparative Example 5 | 0.5% Native Gellan Gum | 65.4 | 71.3 |
| Example 5 | 0.75% Gellan Gum Homogenized Once (Reduced Molecular Weight) | 69.1 | 66.1 |
| Example 5 | 1.0% Gellan Gum Homogenized 4 Times (Reduced Molecular Weight) | 46.4 | 40.3 |

EXAMPLE 6

Gel Setting Temperatures

The gel setting temperature of a native gellan gum solution and two reduced molecular weight gellan gum solutions was measured using a Rheometric Scientific SR-200 controlled stress rheometer (Piscataway, N.J.). The instrument was set in parallel plate mode with a 50 mm top plate and a Peltier temperature controlled bottom plate. The sample was placed on the bottom plate which had been pre-heated to 95° C., and the top plate was lowered to provide a gap of 1 mm. Evaporation was controlled using the supplied solvent evaporation accessory. While measuring at a frequency of 10 radians per second with an applied strain of 2 to 5 percent, the sample was cooled from 95° C. to 50° C. and the visceoelastic properties were measured. The elastic modulus, G', was measured to determine the set temperature. When the G' value exceeded 10 dynes per $cm^2$, the sample was considered to have begun to set. This temperature is referred to as the "set temperature."

The reduced molecular weight gellan gums were prepared as described in Example 1. One of the reduced molecular weight gellan gum solutions was prepared from gellan gum which had been homogenized once, while the other reduced molecular weight gellan gum solution was prepared using gellan gum which had been homogenized four times.

The reduced molecular weight gellan gum solutions were prepared by hydrating sufficient reduced molecular weight gellan gum in deionized water to yield a 0.5% reduced molecular weight gellan gum solution, followed by addition of sufficient 0.5M $CaCl_2$ to yield a solution with a $Ca^{2+}$ ion concentration of 6 mM.

The native gellan gum solution was prepared by hydrating sufficient gellan gum in deionized water to yield a 0.5% gellan gum solution, followed by addition of sufficient 0.5M $CaCl_2$ to yield a solution with a $Ca^{2+}$ ion concentration of 6 mM.

The results of these measurements are presented in FIG. 1. As FIG. 1 shows, solutions prepared from reduced molecular weight gellan gum have a lower gel set point than solutions prepared from untreated native gellan gum.

EXAMPLE 7

Hot Viscosity Measurements

The viscosity of a native gellan gum solution and the viscosity of two reduced molecular weight gellan gum solutions were measured at 95° C. using a Rheometric Scientific SR-200 controlled stress rheometer. The instrument set-up was as described in Examples 6. The test protocol used was steady stress sweep test. Stress values were selected so as provide a maximum coverage of shear rate in the range of 10 to 1000 $s^{-1}$.

The native gellan gum solution was prepared by hydrating sufficient gum in deionized water to yield a 0.5% gellan gum solution. The reduced molecular weight gellan gum solutions were prepared by hydrating sufficient reduced molecular weight gellan gum in deionized water to yield a 0.5% reduced molecular weight gellan gum solution. One of the reduced molecular weight gellan gum solutions was prepared from gellan gum which had been homogenized once, while the other reduced molecular weight gellan gum solution was prepared using gellan gum which had been homogenized four times. The results of these measurements are presented in FIG. 2.

As FIG. 2 shows, solutions prepared from reduced molecular weight gellan gum have lower viscosities at elevated temperatures than do solutions prepared using native gellan gum.

EXAMPLE 8

Molecular Weight Measurement of Native Gellan Gum

Native gellan broth was clarified as follows: to approximately 4 liters of a 1.5% gellan gum broth solution was added sufficient sodium hypochloride to yield a solution having a sodium hypochloride concentration of 1000 ppm. The solution was stirred for 2 hours at 40° C., followed by addition of sufficient Lysozyme (Genencor, Palo Alto, Calif.) to yield a solution having a Lysozyme concentration of 50 ppm. The resultant solution was stirred for 2 hours at 40° C., followed by addition of sufficient HT Protease (Miles Enzymes, Elkhart, Ind.) to yield a solution having an HT Protease concentration of 500 ppm. The resultant solution was stirred for 2 hours at 40° C., followed by addition of sufficient ethylenediaminetetraacetate (EDTA) and sodium dodecyl sulphate (SDS) to yield a solution having EDTA and SDS concentrations of 1000 ppm and 500 ppm, respectively. The resultant solution was stirred for 2 hours at 40° C.

The resultant clarified native gellan broth was then precipitated with two parts by volume isopropyl alcohol. The precipitated gum fiber was then pressed between muslin cloth to 33% solids, and then dried at 60° C. for 12 hours. The fiber was then milled to approximately 250 $\mu$m particle size using a Brinkmann knife mill (Westbury, N.Y.). The dried powder gum was then rehydrated to 1% polymer concentration in deionized water at 90° C.

The 1% solution of native gellan gum then was added to a molecular porous dialysis tubing (Spectra/Por® Membrane MWCO 6-8000). The solution was dialyzed against deionized water for 72 hours. The dialyzed gellan gum was precipitated with isopropyl alcohol before being dried and milled. The polymer was then rehydrated in deionized water to 0.05% polymer concentration at 90° C. Tetramethylammonium chloride (TMAC) was added to yield a 10 mM solution. This purification process was repeated. The resultant solution was cooled to room temperature.

The polymer solution was filtered through both 0.45 μm and 0.50 μm Acrodisc filters. The molecular weight of the native gellan gum polymer was measured using a SEC/MALLS (Size Exclusion Chromatography/Multiple Angle Laser Light Scattering) unit. The SEC/MALLS unit was fitted with a water 410 differential refractometer, a Wyatt Technology—Dawn DSP laser photometer and two Waters Hydrogel columns (2000 and linear in series). The data were analyzed using an Astra 21 program. Table 3 shows that native gellan gum had a weight average molecular weight (Mw) and a number average molecular weight (Mn) of $2.5 \times 10^6$ and $2.2 \times 10^6$, respectively.

EXAMPLE 9

Molecular Weight Measurement of Reduced Molecular Weight Gellan Gum—1× Homogenization The procedure used was as described in Example 8, except that prior to the dialysis step the 1% native gellan gum solution was passed once through an APV Gaulin pressure-drop homogenizer at 8,500 p.s.i. Table 3 shows that gellan gum homogenized once had a weight average molecular weight (Mw) and a number average molecular weight (Mn) of $1.7 \times 10^6$ and $1.6 \times 10^6$, respectively.

EXAMPLE 10

Molecular Weight Measurement of Reduced Molecular Weight Gellan Gum—2× Homogenization The procedure used was as described in Example 9, except that the gellan gum sample was passed through the homogenizer 2 times. The additional homogenization yielded further reduction in the molecular weight of the gellan gum. Table 3 shows that gellan gum homogenized twice had a weight average molecular weight (Mw) and a number average molecular weight (Mn) of $1.2 \times 10^6$ and $1.1 \times 10^6$, respectively.

EXAMPLE 11

Molecular Weight Measurement of Reduced Molecular Weight Gellan Gum—4× Homogenization The procedure used was as described in Example 9, except that the gellan gum sample was passed through the homogenizer 4 times. The additional homogenization yielded further reductions in the molecular weight of the gellan gum. Table 3 shows that gellan gum homogenized four times had a weight average molecular weight (Mw) and a number average molecular weight (Mn) of $9.3 \times 10^5$ and $7.6 \times 10^5$, respectively.

TABLE 3

Molecular weights of gellan gum polymers.

| Sample | Weight Average Molecular Weight (MW) | Number Average Molecular Weight (MN) |
|---|---|---|
| Native Gellan Gum | $2.5 \times 10^6$ | $2.2 \times 10^6$ |
| Gellan Gum Homogenized Once | $1.7 \times 10^6$ | $1.6 \times 10^6$ |
| Gellan Gum Homogenized Twice | $1.2 \times 10^6$ | $1.1 \times 10^6$ |
| Gellan Gum Homogenized Four Times | $9.3 \times 10^5$ | $7.6 \times 10^5$ |

Other variations and modifications of this invention will be obvious to those skilled in the art. This invention is not limited except as set forth in the claims.

What is claimed is:

1. A reduced molecular weight gellan gum comprising tetrasaccharide repeat units of the formula:

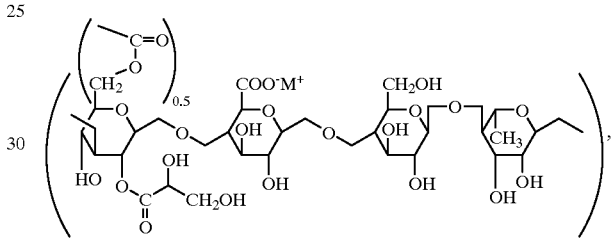

wherein the gellan gum has a weight average molecular weight between about $1.7 \times 10^6$ and about $4.0 \times 10^5$ as measured by Size Exclusion Chromatography/Multiple Angle Laser Light Scattering.

2. The gellan gum of claim 1, wherein the weight average molecular weight of said gellan gum is less than or equal to about $1.2 \times 10^6$ as measured by Size Exclusion Chromatography/Multiple Angle Laser Light Scattering.

3. The gellan gum of claim 1, wherein the weight average molecular weight of said gellan gum is between about $1.2 \times 10^6$ and about $9.3 \times 10^5$ as measured by Size Exclusion Chromatography/Multiple Angle Laser Light Scattering.

4. A composition comprising:
   (a) a reduced molecular weight gellan gum comprising tetrasaccharide repeat units of the formula:

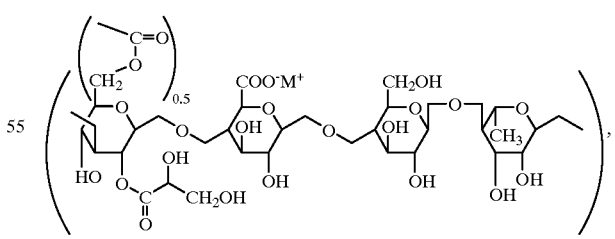

wherein the gellan gum has a weight average molecular weight between about $1.7 \times 10^6$ and about $4.0 \times 10^5$ as measured by Size Exclusion Chromatography/Multiple Angle Laser Light Scattering; and
   (b) water.

5. The composition of claim 4, wherein the weight average molecular weight of said gellan gum is less than or equal to about $1.2\times10^6$ as measured by Size Exclusion Chromatography/Multiple Angle Laser Light Scattering.

6. The composition of claim 4, further comprising a gelling salt.

7. The composition of claim 6, wherein said gelling salt is selected from the group consisting of a calcium salt, a potassium salt and a sodium salt.

8. The composition of claim 7, further comprising a sequestrant.

9. The composition of claim 8, wherein said sequestrant is sodium citrate.

10. The composition of claim 7, wherein said gelling salt is a calcium salt.

11. The composition of claim 7, further comprising a fluid food product.

12. The composition of claim 11, wherein said fluid food product is selected from the group consisting of confectionery jellies, jams, jellies, dessert gels, icings, non-dairy frozen toppings, bakery fillings and dairy products.

13. A process for preparing a reduced molecular weight gellan gum comprising tetrasaccharide repeat units of the formula:

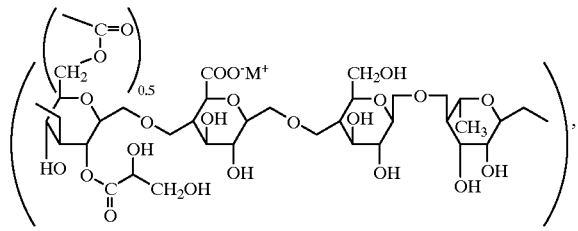

wherein the qellan gum has a weight average molecular weight between about $1.7\times10^6$ and about $4.0\times10^5$ as measured by Size Exclusion Chromatography/Multiple Angle Laser Light Scattering, said process comprising:

(a) hydrating the gellan gum in water; and (b) reducing the molecular weight of said gellan gum whereby reduced molecular weight gellan gum is produced.

14. The process of claim 13, wherein the weight average molecular weight of said reduced molecular weight gellan gum is less than or equal to about $1.2\times10^6$ as measured by Size Exclusion Chromatography/Multiple Angle Laser Light Scattering.

15. The process of claim 13, wherein the molecular weight of said native gellan gum is reduced by a treatment selected from the group consisting of homogenization, sonication, radiation, oxidation and hydrolysis.

16. The process of claim 15, wherein said treatment is homogenization.

17. The process of claim 13, further comprising the step of reducing the molecular weight of said reduced molecular weight gellan gum.

18. The process of claim 17, wherein the molecular weight of said reduced molecular weight gellan gum is reduced by a treatment selected from the group consisting of homogenization, sonication, radiation, oxidation and hydrolysis.

19. The process of claim 18, wherein said treatment is homogenization.

20. A composition comprising:

(a) a reduced molecular weight gellan gum comprising tetrasaccharide repeat units of the formula:

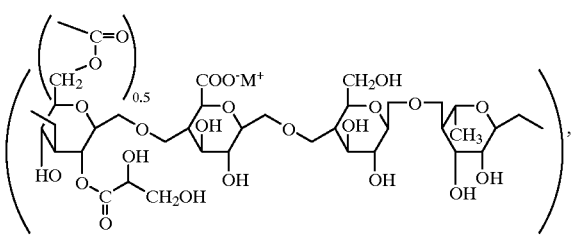

wherein the gellan gum has a weight average molecular weight between about $1.7\times10^6$ and about $4.0\times10^5$ as measured by Size Exclusion Chromatography/Multiple Angle Laser Light Scattering;

(b) water;

(c) a gelling salt; and (d) a sequestrant, wherein said composition is a gel.

21. The composition of claim 20, wherein the weight average molecular weight of said reduced molecular weight gellan gum is less than or equal to about $1.2\times10^6$ as measured by Size Exclusion Chromatography/Multiple Angle Laser Light Scattering.

22. The composition of claim 21, wherein said gelling salt is selected from the group consisting of a calcium salt, a potassium salt and a sodium salt.

23. The composition of claim 22, wherein said gelling salt is a calcium salt.

24. The composition of claim 23, wherein said sequestrant is sodium citrate.

25. The product obtained by the process comprising:

(a) hydrating gellan gum comprising tetrasaccharide repeat units of the formula

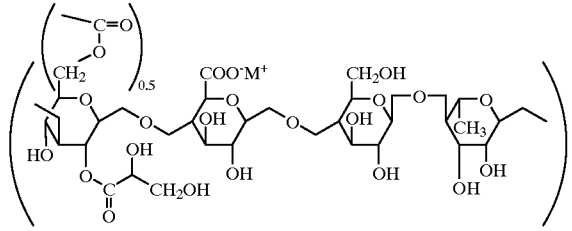

in water; and (b) reducing the molecular weight of said gellan gum to between about $1.7\times10^6$ and about $4.0\times10^5$ as measured by Size Exclusion Chromatography/Multiple Angle Laser Light Scattering.

26. The product of claim 25, wherein the molecular weight of said native gellan gum is reduced by a treatment selected from the group consisting of homogenization, sonication, radiation, oxidation and hydrolysis.

27. The product of claim 26, wherein said treatment is homogenization.

* * * * *

UNITED STATES PATENT AND TRADEMARK OFFICE
CERTIFICATE OF CORRECTION

PATENT NO.     : 6,242,035 B1
DATED          : September 25, 2001
INVENTOR(S)    : Ross Clark et al.

Page 1 of 1

It is certified that error appears in the above-identified patent and that said Letters Patent is hereby corrected as shown below:

<u>Column 6,</u>
Table 1B, "Example 3" (second occurrence) should be deleted.

Signed and Sealed this

Fifth Day of March, 2002

Attest:

JAMES E. ROGAN
*Attesting Officer*      *Director of the United States Patent and Trademark Office*